(12) United States Patent
Shiragami

(10) Patent No.: US 6,851,875 B2
(45) Date of Patent: Feb. 8, 2005

(54) PRINTER AND PRINT IMAGE REFERENCE SYSTEM

(75) Inventor: Minoru Shiragami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/288,368

(22) Filed: Nov. 6, 2002

(65) Prior Publication Data

US 2003/0175061 A1 Sep. 18, 2003

(30) Foreign Application Priority Data

Mar. 15, 2002 (JP) ........................................ 2002-072606

(51) Int. Cl.$^7$ .............................. B41J 11/44; B41J 5/30; G06K 15/00
(52) U.S. Cl. ........................... 400/76; 400/61; 400/586; 358/1.9; 358/1.14; 358/1.15; 358/1.18
(58) Field of Search ........................... 400/76, 582, 61; 358/1.15, 1.16, 1.9, 1.14, 1.18

(56) References Cited

U.S. PATENT DOCUMENTS

| | | | | |
|---|---|---|---|---|
| 5,963,216 A | * | 10/1999 | Chiarabini et al. | 345/660 |
| 6,012,083 A | * | 1/2000 | Savitzky et al. | 709/202 |
| 6,101,513 A | * | 8/2000 | Shakib et al. | 715/527 |
| 6,134,567 A | * | 10/2000 | Nakkiran et al. | 715/526 |
| 6,181,436 B1 | * | 1/2001 | Kurachi | 358/1.15 |
| 6,285,461 B1 | * | 9/2001 | Fujii et al. | 358/1.18 |
| 6,616,359 B1 | * | 9/2003 | Nakagiri et al. | 400/582 |
| 6,618,553 B1 | * | 9/2003 | Shiohara | 386/117 |
| 6,633,395 B1 | * | 10/2003 | Tuchitoi et al. | 358/1.14 |

FOREIGN PATENT DOCUMENTS

| | | |
|---|---|---|
| JP | 5-143250 | 6/1993 |
| JP | 5-216454 | 8/1993 |
| JP | 2000-305925 | 11/2000 |

* cited by examiner

Primary Examiner—Andrew H. Hirshfeld
Assistant Examiner—Wasseem H. Hamdan
(74) Attorney, Agent, or Firm—Armstrong, Kratz, Quintos, Hanson & Brooks, LLP

(57) ABSTRACT

A printer which can refer to a print image before a print operation. This printer includes a storage unit that stores a print image and identification information for specifying the print image such that the print image corresponds to the identification information. It also includes an identification information acquiring unit acquiring the identification information that specifies the print image. It further includes a print image read unit reading the print image to which the identification information acquired by the identification information acquiring unit corresponds from the storage unit. Still further the printer includes a print image output unit outputting the print image ready by the print image read unit.

17 Claims, 10 Drawing Sheets

1) DATA FLOW USED WHEN NORMAL Windows INFORMATION TRANSMISSION PATH IS USED
2) DATA FLOW USED IN DIRECT ACCESS BY DEDICATED APPLICATION

PREVIEW DATA ACQUISITION

| INFORMATION ACQUIRING HEADER | PRINTER IDENTIFICATION INFORMATION | GET COMMAND | DOCUMENT NAME |
|---|---|---|---|

1) THE DATA FORMAT IS TRANSFERRED TO PRINTER SERVING AS TARGET BY BINARY DATA
2) PRINTER WHICH RECEIVES DATA RETURNS PREVIEW DATA

FIG. 6

| INFORMATION ACQUIRING HEADER | PRINTER IDENTIFICATION INFORMATION | GET COMMAND |
|---|---|---|

1) TRANSFER THE DATA FORMAT TO PRINTER SERVING AS TARGET BY BINARY DATA
2) PRINTER WHICH RECEIVES DATA RETURNS LIST DATA

FIG. 7

| IDENTIFICATION INFORMATION |
|---|
| DOCUMENT NAME |
| STORED DATA CAPACITY |
| PRINT SETTING INFORMATION |
| PRINT IMAGE |

FIG. 8

| IDENTIFICATION INFORMATION |
|---|
| THE TOTAL NUMBER OF STORED DOCUMENTS |
| STORED DATA CAPACITY |
| DOCUMENT NAME 1 |
| DOCUMENT NAME 2 |
| DOCUMENT NAME n |

FIG. 9

| IDENTIFICATION INFORMATION |
|---|
| DOCUMENT NAME |
| PRINT SETTING INFORMATION |

PRINTER AND PRINT IMAGE REFERENCE SYSTEM

BACKGROUND OF THE INVENTION

The present invention relates to a printer which can refers to a print image before a print operation and, more particular, to a printer which is designed to be able to decide whether a print operation is actually necessary or not before the print operation after transmission of a printer output (print image, data for generating a print image, or the like) to the printer.

Conventionally, when a document or the like formed by an information terminal such as a personal computer is to be printed by a printer, if a paper size or the like is erroneously specified, an inappropriate print may be obtained as a result, an unnecessary print operation may be executed. Furthermore, when color data is output to a monochrome printer, colors or the like are different from those of the color data. However, an inappropriate print or an unnecessary print is often known after the contents of the print result are checked. For this reason, sheets of paper cannot be disadvantageously prevented from being consumed by these inappropriate and unnecessary prints.

It is an object of the present invention to prevent an inappropriate print operation or an unnecessary print operation from being executed before an actual print operation by making it possible to refer to a print image before the print operation.

SUMMARY OF THE INVENTION

In order to solve the above problem, the present invention provides a printer which can refer to a print image before a print operation, comprising: a storage unit which stores a print image and identification information for specifying the print image such that the print image corresponds to the identification information; an identification information acquiring unit for acquiring the identification information for specifying the print image; a print image read unit for reading the print image to which the identification information acquired by the identification information acquiring unit corresponds from the storage unit; and a print image output unit for outputting the print image read by the print image read unit.

According to the present invention, the print image can be referred to before a print operation, an inappropriate print operation or an unnecessary print operation can be prevented from being executed before an actual print operation, and a sheet of paper can be prevented from being consumed by these print operations.

The printer further comprises, for example, a printer output acquiring unit for acquiring a print image as a printer output from an external information terminal. In the storage unit, the print image acquired by the printer output acquiring unit and identification information for specifying the print image are stored such that the print image corresponds to the identification information.

In this manner, the print image based on the printer output from the external information terminal can be stored in the storage unit of the printer. The printer output in this case is, for example, data including a print image generated by the external information terminal.

The printer further comprises: for example, a printer output acquiring unit for acquiring data for generating a print image as a printer output from an external information terminal; and a print image generation unit for generating a print image based on the data acquired by the printer output acquiring unit. In the storage unit, the print image generated by the print image generation unit and identification information for specifying the print image are stored such that the print image corresponds to the identification information.

In this manner, the print image based on the printer output from the external information terminal can be stored in the storage unit of the printer. The printer output in this case is, for example, data (page description language or the like), generated by the external information terminal, for generating a print image.

In the printer, for example, the identification information acquiring unit acquires identification information for specifying a print image from an external information terminal, and the print image output unit transmits the print image read by the print image read unit to the external information terminal.

In this manner, the print image held by the printer can be referred to from the external information terminal.

The printer further comprises: for example, an identification information input unit for inputting identification information for specifying a print image; and an image display device for displaying the print image. The identification information acquiring unit acquires identification information for specifying a print image from the identification information input unit, and the print image output unit displays the print image read by the print image read unit on the image display device.

In this manner, a print image held by the printer can be referred to by the image display device provided in the printer.

The printer further comprises: for example, a storage unit for storing print setting information for a print image; a change information acquiring unit for acquiring change information for changing the print setting information; and a change unit for changing the print setting information stored in the storage unit based on the change information acquired by the change information acquiring unit.

In this manner, when a print image which is referred to before a printing operation is a different image, the print setting information can be changed.

In the printer, for example, the change information acquiring unit acquires change information for changing the print setting information from an external information terminal.

The present invention can specify the following as an invention of a system. A print image referring system which can refer to a print image before a print operation comprises: a storage unit for storing the print image and identification information for specifying the print is image such that the print image corresponds to the identification information; an identification information input unit for inputting the identification information for specifying the print image; a first print image acquiring unit for acquiring the print image to which the identification information input by the identification information acquiring unit corresponds from the storage unit; and an image display device for displaying the print image acquired by the first print image acquiring unit.

The print image referring system comprises, for example, a printer and an external information terminal. The printer comprises the storage unit, and the external information terminal comprises the identification information input unit, the first print image acquiring unit, and the image display device.

In the print image referring system, for example, the external information terminal further comprises a print image generation unit for generating a print image, the printer further comprises a second print image acquiring unit for acquiring the print image generated by the print image generation unit, and the print image acquired by the second image acquiring unit and identification information for specifying the print image are stored in the storage unit such that the print image corresponds to the identification information.

In the print image referring system, for example, the printer further comprises a print image generation unit for generating a print image, and the print image generated by the print image generation unit and identification information for specifying the print image are stored in the storage unit such that the print image corresponds to the identification information.

In the print image referring system, for example, the printer further comprises: a storage unit for storing print setting information for a print image; a change information acquiring unit for acquiring change information for changing the print setting information; and a change unit for changing print setting information stored in the storage unit based on the change information acquired by the change information acquiring unit.

DETAILED DESCRIPTION OF THE PREFERRED EMBODIMENTS

Figure 1:
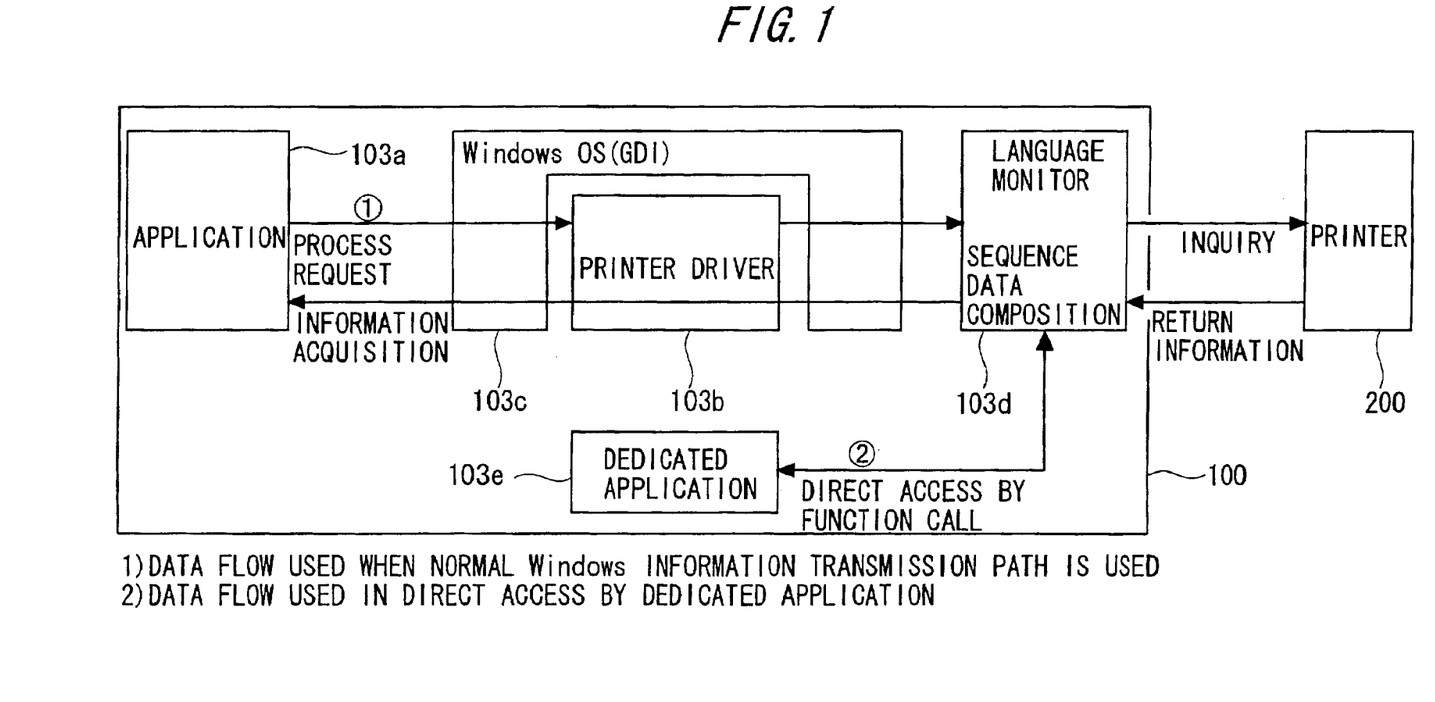
FIG. 1 is a diagram for explaining a schematic system configuration of a print image referring system according to the present invention.
Figure 2:
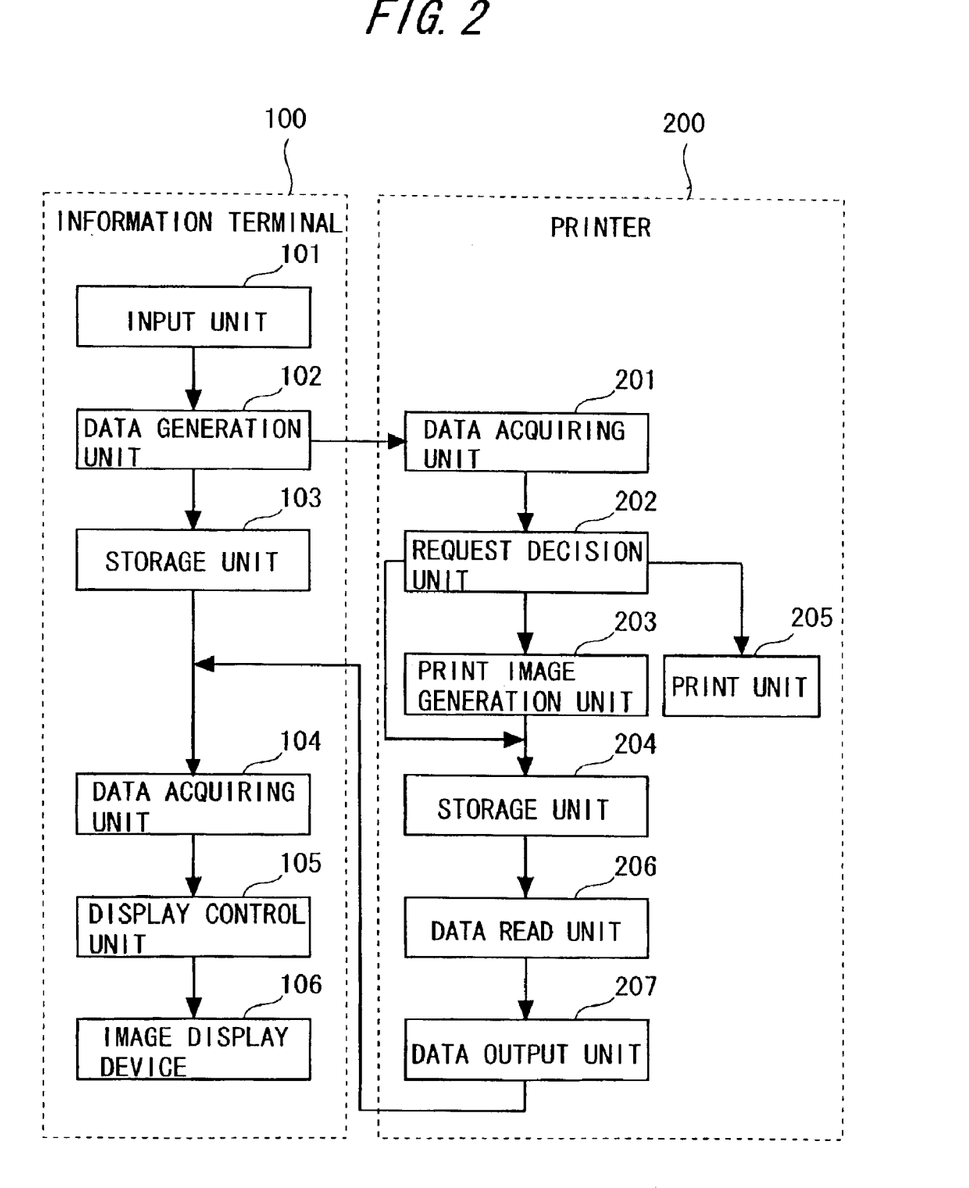
FIG. 2 is a diagram for explaining main functional blocks for realizing the print image referring system according to the present invention.

A schematic system configuration of a print image referring system according to the present invention which can refer to a print image before a print operation will be described below with reference to the accompanying drawings. FIG. 1 is a diagram for explaining a schematic system configuration of the print image referring system. FIG. 2 is a diagram for explaining main functional blocks for realizing the print image referring system.

As shown in FIGS. 1 and 2, the print image referring system includes an information terminal 100 and a printer 200. Both the components are connected to each other by a cable communication or a wireless communication, so that data communication can be executed through the cable communication or the wireless communication.

The information terminal 100 is an information terminal such as a personal computer. The information terminal 100 provides with a control unit (not shown) such as a CPU which controls the entire operation of the information terminal, an input unit 101 connected to the control unit through a bus or the like, a data generation unit 102, a storage unit 103 such as a built-in or external hard disk drive, a data acquiring unit 104, a display control unit 105, an image display device 106, an internal memory (not shown) such as a RAM, and the like.

The input unit 101 is to input identification information for specifying a print image. As the input unit 101, for example, an input device such as a keyboard or a mouse can be used.

In the storage unit 103, an operating system (to be referred to as an OS hereinafter) such as the Windows having a drawing function (e.g., a GDI module 103c) is installed. In addition, programs such as an application 103a and a printer driver 103b which are executed on the OS are installed.

The application 103a is a program having a function for forming or editing a document, an image, or the like printed by the printer 200. The document or the like formed or edited by the application 103a is converted into a printer output by the printer driver 103b and the drawing function 103c of the OS. The printer output is transmitted to the printer 200 through a language monitor 103d. The printer driver 103b, the drawing function 103c of the OS, and the language monitor 103d correspond to the data generation unit 102.

The printer driver 103b is mainly to convert a drawing command formed by the drawing function 103c into a printer output (output of a form which can be recognized by the printer 200). For example, the printer driver 103b converts the drawing command into a print image including print setting information as a printer output. As the print setting information, a paper size (A4 size, A5 size, or the like), a direction of paper (vertical, horizontal, or the like), print specification information which specifies a command that the print image is immediately printed or a command that these data are held in the printer 200 without executing a print operation, and the like are known.

The GDI module 103c is mainly to form a drawing command for a document, an image, or the like. In general, the formed drawing command is stored in a temporary file.

The language monitor 103d is to assemble a sequence and to transmit the assembled sequence to the printer 200. When the language monitor 103d receives a process request from the application 103a through the OS and the printer driver 103b, the language monitor 103d assembles a sequence to transmit the sequence to the printer 200. The language monitor 103*d* can be directly accessed (without passing through the OS and the printer driver 103*b*) by a function call from a dedicated application 103*e*.

The data acquiring unit 104 is to acquire various data such as a print image and a data list from the printer 200. The display control unit 105 is to display various screens on the image display device 106 based on the data acquired by the data acquiring unit 104. For example, when the data acquiring unit 104 acquires a print image from the printer 200, the display control unit 105 displays the screen of the print image on the image display device 106 based on the print image.

The image display device 106 is a device for displaying a print image or the like. As the image display device 106, for example, various displays such as a CRT display or a liquid crystal display can be used.

The printer 200 is a page printer (e.g., a laser printer) which prints an image (e.g., printed on a sheet of paper having an A4 size) based on a print image (also called a drawing image) stored in a page buffer.

The printer 200 is provided with a control unit (not shown) such as a CPU which controls the entire operation of the printer 200, a data acquiring unit 201, a request decision unit 202, a print image generation unit 203, a storage unit 204, a print unit 205, a data read unit 206, a data output unit 207, an internal memory (not shown) such as a RAM, and the like which are connected to the control unit through a bus or the like.

The data acquiring unit 201 is to acquire a printer output, a sequence data such as a process request, identification information (e.g., document name) for specifying a print image, and change information for changing print setting information. The data acquiring unit 201 acquires these data from, e.g., the external information terminal 100. The data acquiring unit 201 acquires a print image from the external information terminal 100 as, e.g., a printer output. The data acquiring unit 201 may acquire data (e.g., a page description language) for generating a print image from the external information terminal 100 as a printer output.

The request decision unit 202 is to decide request contents from the information terminal 100. The request decision unit 202 decides the request contents based on the sequence acquired by the data acquiring unit 201. The request decision unit 202 decides based on print specification information (included in a printer output) acquired by the request decision unit 202 whether the print image is stored in the storage unit 204 or printed by the print unit 205.

The print image generation unit 203 is to extract a print image from the printer output acquired by the request decision unit 202. When the data acquiring unit 201 acquires data for generating a print image as a printer output, the print image generation unit 203 generates the print image based on the acquired data.

Figure 3:
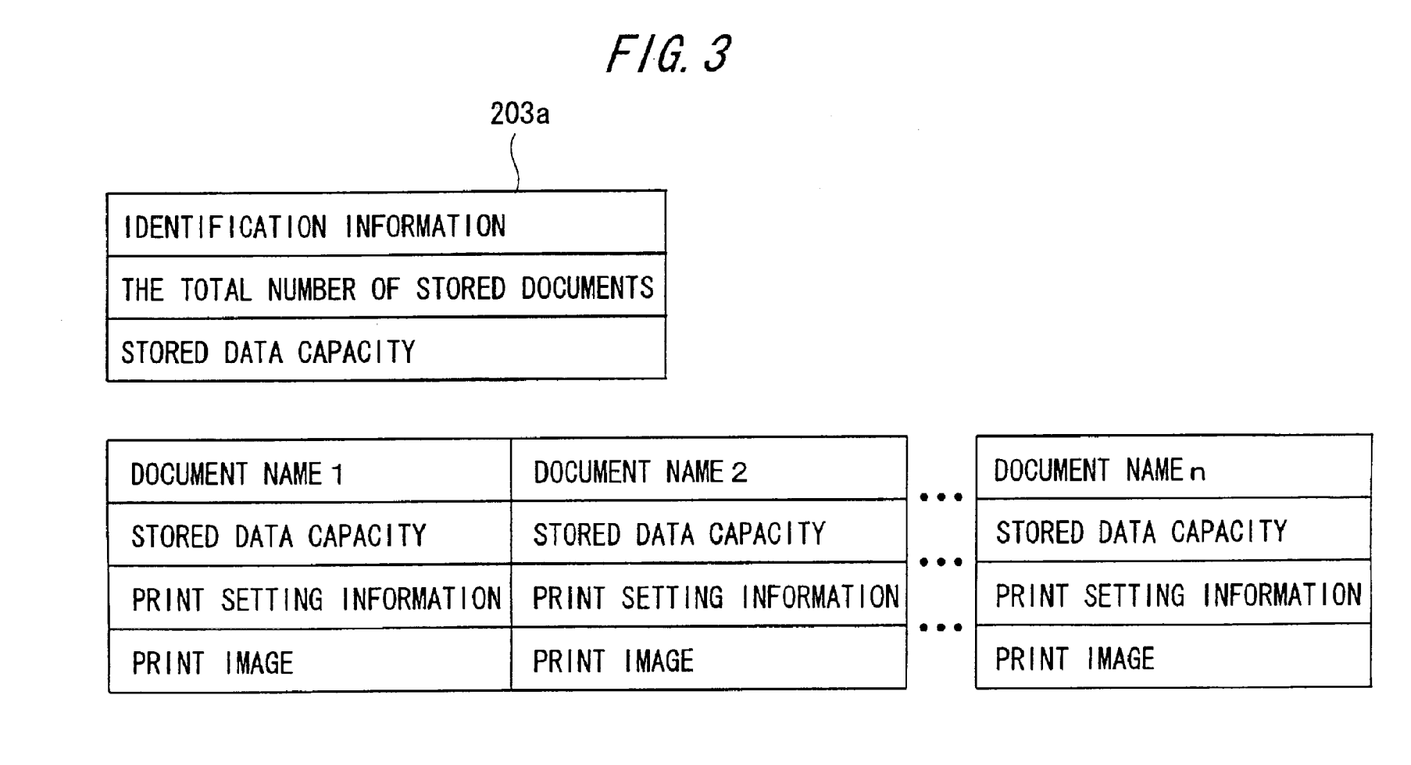
FIG. 3 is a diagram showing management information stored in a storage unit of a printer included in the print image referring system according to the present invention.

The storage unit 204 is a storage device which stores a print image and identification information for specifying the print image such that the print image corresponds to the identification information. As the storage unit 204, for example, a storage device such as a hard disk device having a relatively large capacity can be used. For example, in the storage unit 204, a print image extracted (or generated) by the print image generation unit 203 is stored such that, as shown in FIG. 3, the print image corresponds to a document name serving as identification information for specifying the print image, a stored data capacity, and print setting information.

The print image may be converted into a preview image having a smaller size to store the preview image in the storage unit 204 as a print image. In the storage unit 204, a print image management file 203*a* consisting of the items of identification information of each printer, the number of stored documents, and a total stored data capacity is also stored.

The print unit 205 is a device for printing a print image based on a print image extracted (or generated) by the print image generation unit 203. When the printer 200 is a laser printer, the print unit 205 includes a photosensitive drum or a laser beam irradiation unit for forming a print image on the surface of the photosensitive drum.

The data read unit 206 is to read the print image to which the identification information acquired by the data acquiring unit 201 corresponds from the storage unit 204. For example, the data read unit 206 uses a document name as a key and reads a print image (or a preview image) to which the document name corresponds from the storage unit 204. The data read unit 206 also reads various data such as a data list from the storage unit 204.

The data output unit 207 is to output a print image read by the data read unit 206. The data output unit 207 transmits the various data such as the print image and the data list which are read by the data read unit 206 to the external information terminal 100.

Figure 4:
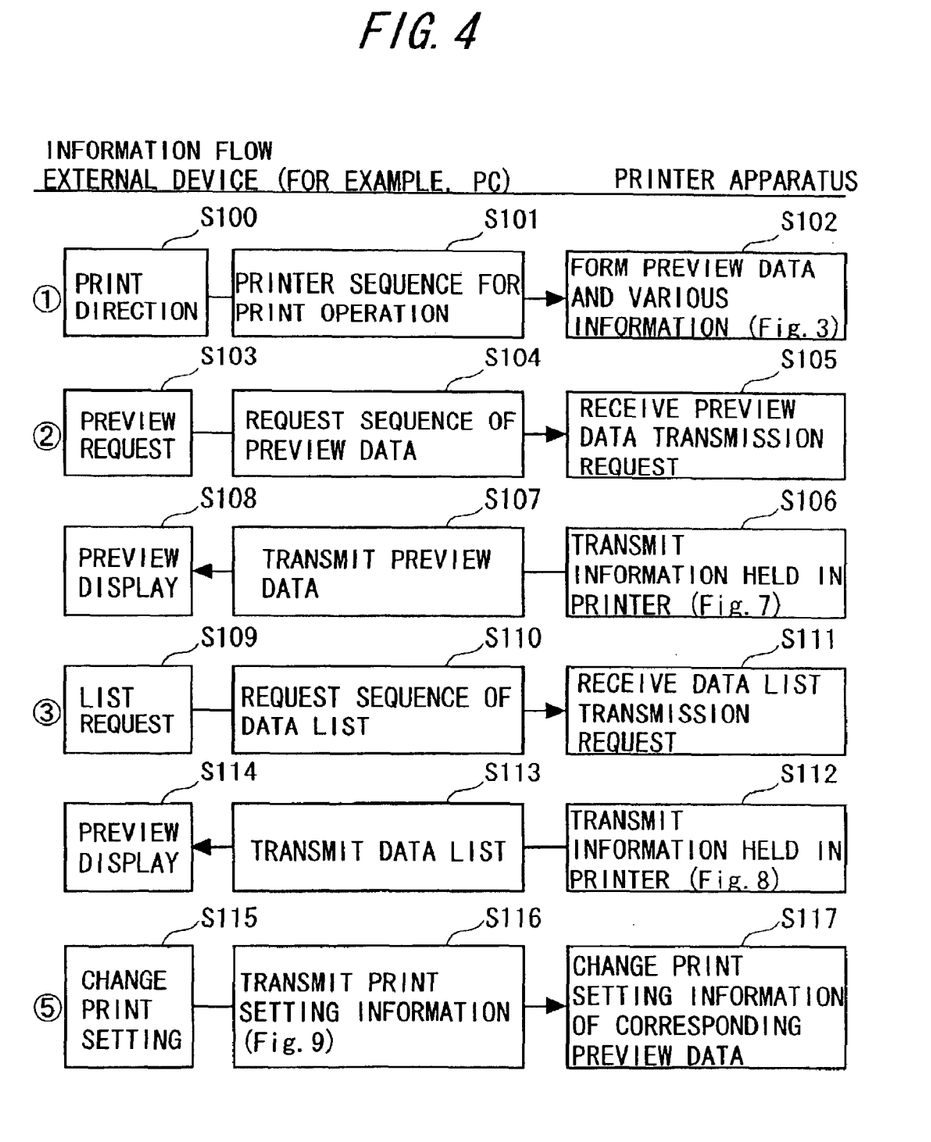
FIG. 4 is a flow chart for explaining an operation of the print image referring system according to the present invention.

An operation of a print image referring system having the above configuration will be described below with reference to the accompanying drawings. FIG. 4 is a flow chart for explaining the operation of the print image referring system.

When a user sets print setting information from the input unit 101 through a print setting screen or the like displayed on the image display device 106 when a document or the like formed or edited by the application 103*a* is to be printed. As the print setting information, a paper size, a direction of paper, print specification information for specifying a command that the print image is immediately printed or a command that these data are held in the printer 200 without executing a print operation, and the like are known.

Upon completion of the setting of the print setting information, the user directs a print operation from the input unit 101 (S100). For example, the user directs a print operation by clicking a print button on a print setting screen with a mouse. When the print operation is directed, it is notified to the language monitor 103*d* that the print operation is directed through the printer driver 103*b*. The language monitor 103*d* which receives the notification assembles a printer sequence for printing the image and transmits the assembled sequence to the printer 200 (S101).

When a print operation is directed, a document or the like formed or edited by the application 103*a* is converted into a printer output (print image including print setting information) by the printer driver 103*b* and the drawing function 103*c* of the OS. This printer output is transmitted to the printer 200 through the language monitor 103*d* (S101).

The printer 200 causes the data acquiring unit 201 to acquire the printer output or the printer sequence transmitted from the information terminal 100 (S102). When the printer 200 acquires the printer output or the printer sequence, request contents of the information terminal 100 are decided by the request decision unit 202. The request decision unit 202 decides the request contents of the information terminal 100 based on the sequence acquired from the information terminal 100. In this case, the sequence from the information terminal 100 is a printer sequence, the request decision unit 202 decides that print direction is requested.

The request decision unit 202 decides based on the print specification information (included in the printer output) acquired from the information terminal 100 whether the print image (included in the printer output) is stored in the storage unit 204 or printed by the print unit 205.

For example, when it is specified by the print specification information that the print image is held in the printer 200 without being printed, the request decision unit 202 decides that the print image is stored in the storage unit 204. On the other hand, when it is specified by the print specification information that the print image is immediately printed, the request decision unit 202 decides that the print image is immediately printed.

When the request decision unit 202 decides that the print image is stored in the storage unit 204, the print image acquired by the data acquiring unit 201, as shown in FIG. 3, is stored in the storage unit 204 such that the print image corresponds to a document name, a stored data capacity, and print setting information. In this case, the print image is not printed from the print unit 205 (the print image is printed when the print sequence is acquired from the information terminal 100).

In this manner, the printer 200 holds (stores) the print image in the print image storage unit 207. Therefore, in a conventional printer, even though it is known that a print image is unnecessary, there is no method of interrupting a print operation for the print image. However, in the printer according to this embodiment, the print operation can be interrupted when it is known that the print operation is unnecessary.

On the other hand, when the request decision unit 202 decides that the print image is immediately printed, the print image (included in the printer output) acquired by the data acquiring unit 201 is immediately printed from the print unit 205.

An operation of viewing the print image held by the printer 200 from the information terminal 100 will be described below.

When a user intends to view the print image held by the printer 200, the user makes a preview request by specifying a document name serving as identification information for specifying a print image (or without specifying the document name (S103). The preview request is made, for example, by clicking a preview request button of the menu screen with the mouse.

Figure 5:
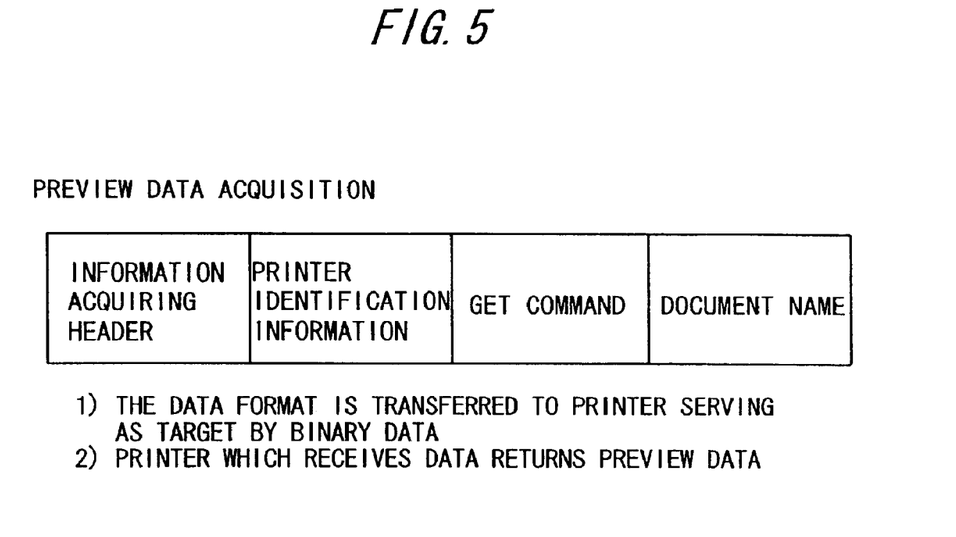
FIG. 5 is a diagram for explaining a sequence used in the print image referring system according to the present invention.

When the preview request is made, it is notified to the language monitor 103d that the preview request is made through the OS and the printer driver 103b. The language monitor 103d which receives the notification assembles a request sequence of preview data, and transmits the assembled request sequence (when a document name is specified, the request sequence includes the document name) to the printer 200 (S104). FIG. 5 shows an example of the request sequence of the preview data.

The printer 200 causes the data acquiring unit 201 to acquire the request sequence transmitted from the information terminal 100 (S105). When the printer 200 acquires the request sequence, the printer 200 decides the request contents of the information terminal 100 by the request decision unit 202. The request decision unit 202 decides the request contents of the information terminal 100 based on the sequence acquired by the information terminal 100. In this case, since the sequence from the information terminal 100 is the request sequence of the preview data, the request decision unit 202 decides that the preview data is requested.

Figure 7:
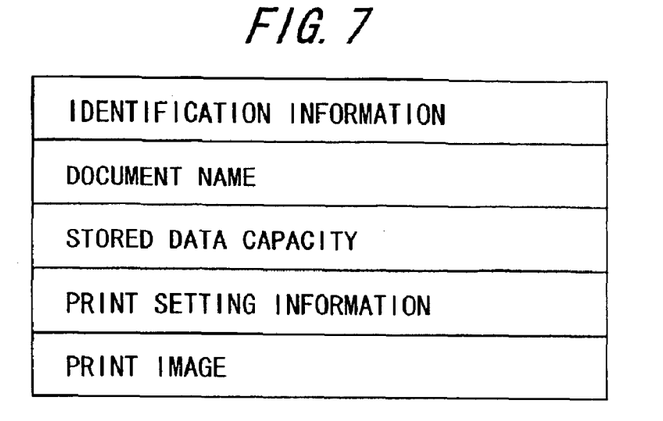
FIG. 7 is a diagram of a data structure of preview data transmitted to an information terminal in the print image referring system according to the present invention.

When it is decided that the preview data is requested, the printer 200 causes the data read unit 206 to read a print image (when a document name is specified, the document name corresponds to the print image) from the storage unit 204, and causes the data output unit 207 to transmit the read print image to the information terminal 100 (S106 and S107). FIG. 7 shows the data structure of the preview data transmitted to the information terminal 100.

The information terminal 100 causes the data acquiring unit 104 to acquire the print image transmitted from the printer 200, and causes the display control unit 105 to display the screen of the print image on the image display device 106 based on the acquired print image (S108).

In this manner, the print image held by the printer 200 can be viewed from the information terminal 100. Therefore, since the print image can be referred to before a print operation, an inappropriate print operation or an unnecessary print operation can be prevented from being executed before an actual print operation.

An operation of acquiring a list of print images from the printer 200 and viewing a specified print image from the list from the information terminal 100 will be described below.

Figure 6:
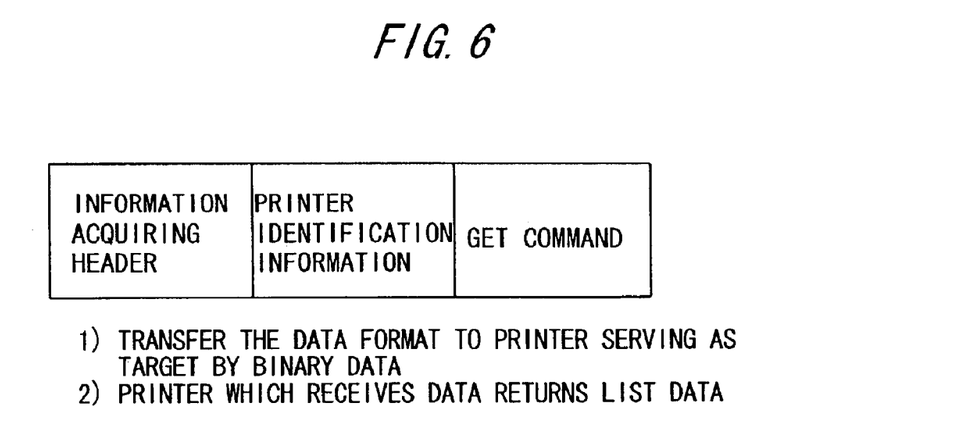
FIG. 6 is a diagram for explaining a sequence used in the print image referring system according to the present invention.

A user requests a list (S109). For example, the user requests the list by clicking a list request button of the menu screen with the mouse. When the list is requested, it is notified to the language monitor 103d that the list is requested through the OS and the printer driver 103b. The language monitor 103d which receives the notification assembles a request sequence of the data list, and transmits the assembled request sequence to the printer 200 (S110). FIG. 6 shows an example of the request sequence of the data list.

The printer 200 causes the data acquiring unit 201 to acquire the request sequence transmitted from the information terminal 100 (S111). When the printer 200 acquires the request sequence, the printer 200 causes the request decision unit 202 to decide the request contents of the information terminal 100. The request decision unit 202 decides the request contents of the information terminal 100 based on the sequence acquired from the information terminal 100.

Figure 8:
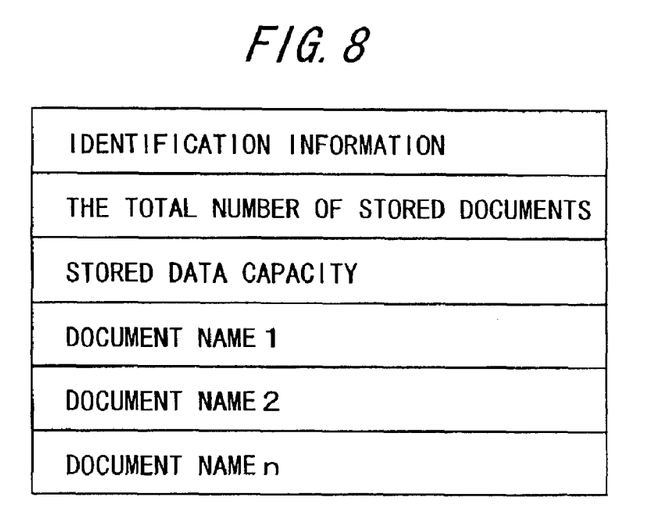
FIG. 8 is a diagram of a data structure of a data list transmitted to the information terminal in the print image referring system according to the present invention.

In this case, since the sequence from the information terminal 100 is the request sequence of the data list, the request decision unit 202 decides that the data list is requested. When it is decided that the data list is requested, the printer 200 causes the data read unit 206 to read the data list from the storage unit 204, and causes the data output unit 207 to transmit the read data list to the information terminal 100 (S112 and S113). FIG. 8 shows the data structure of the data list transmitted to the information terminal 100.

The information terminal 100 causes the data acquiring unit 104 to acquire the data list transmitted from the printer 200, and causes the display control unit 105 to display the screen of the data list on the image display device 106 based on the acquired data list (S114). On the screen of the data list, document names of print images held by the printer 200 are displayed as a list. A user specifies a document name to be viewed from the data list and makes a preview request to acquire the print image to which the specified document name corresponds from the printer 200. The user can view the print image by displaying it on the image display device 106 (S103 to S108).

Figure 10:
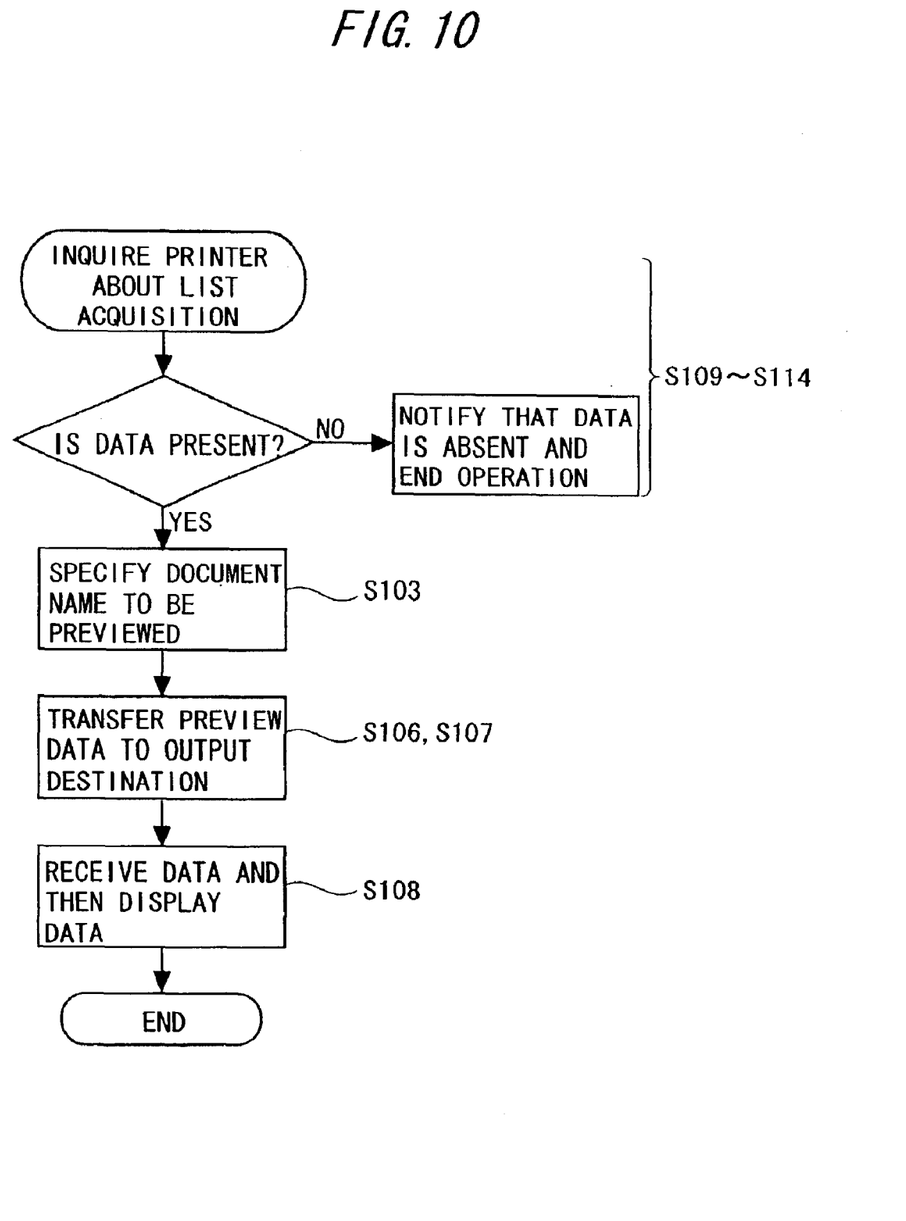
FIG. 10 is a flow chart for explaining an operation of the print image referring system according to the present invention.

In this manner, the list of print images are acquired from the printer 200, and a print image specified from the list can be viewed from the information terminal 100. Therefore, since a print image can be referred to before a print operation for the print image, an inappropriate print operation or an unnecessary print operation can be prevented from being executed before an actual print operation. FIG. 10 exactly explains an operation of acquiring a list of print images from the printer 200 and viewing a print image specified from the list from the information terminal 100.

An operation of changing print setting information held by the printer 200 from the information terminal 100 will be described below.

When the print setting information held by the printer is changed, a user specifies a document name and sets the changed print setting information (change information for changing print setting information) from the input unit 101 through the print setting screen. Upon completion of the change and setting of the print setting information, the user direct the change of the print setting from the input unit 102 (S115). For example, the user directs the change by clicking a print setting change button of the print setting screen with the mouse.

When the change of print setting is directed, it is notified to the language monitor 103*d* that the change of the print setting is directed through the OS and the printer driver 103*b*. The language monitor 103*d* which receives the notification assembles a printer sequence for changing the print setting, and transmits the assembled sequence to the printer 200 (S116).

Figure 9:
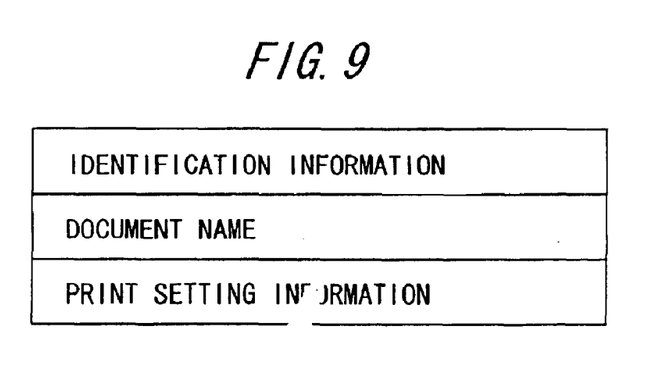
FIG. 9 is a diagram of a data structure of print setting information transmitted to the printer in the print image referring system according to the present invention.

When the change of the print setting is directed, the printer setting information is converted by the printer driver 103*b* or the like into a printer output (changed print setting information including a specified document name). The printer output is transmitted to the printer 200 through the language monitor 103*d* (S116). FIG. 9 shows the data structure of the print setting information transmitted to the printer 200.

The printer 200 causes the data acquiring unit 201 to acquire the printer output or the sequence transmitted from the information terminal 100 (S117). When the printer 200 acquires the printer output or the sequence, the printer 200 causes the request decision unit 202 to decides the request contents of the information terminal 100. The request decision unit 202 decides the request contents of the information terminal 100 based on the sequence acquired from the information terminal 100. In this case, since the sequence from the information terminal 100 is a sequence for changing the print setting, the request decision unit 202 decides that the change of the print setting is requested.

When the request decision unit 202 decides that the change of the print setting is requested, based on the changed print setting information (changed information) acquired by the data acquiring unit 201, the print setting information in the storage unit 204 to which a document name (document name included in the changed print setting information acquired by the data acquiring unit 201) specified by the user corresponds is changed (S117).

Figure 11:
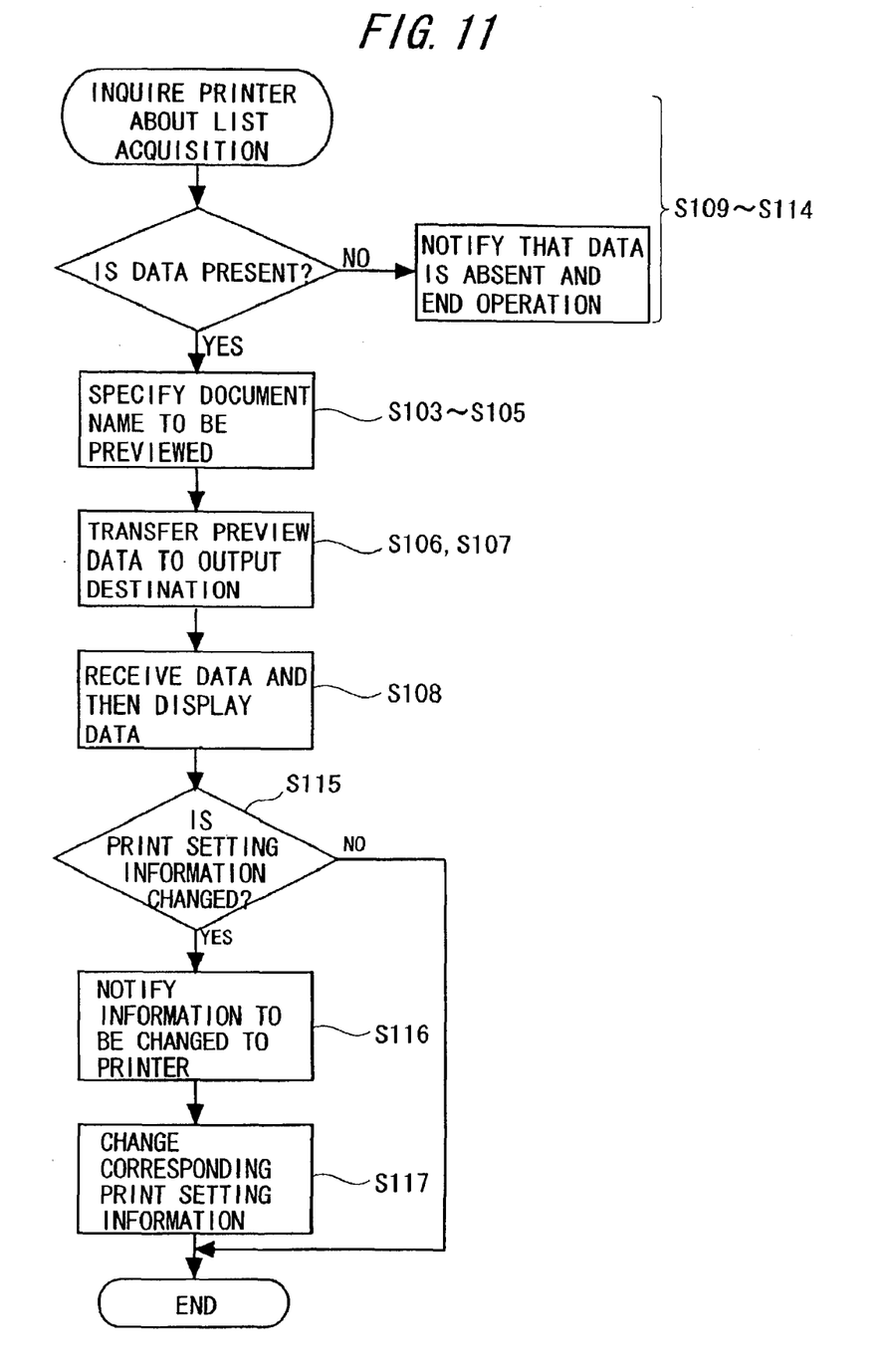
FIG. 11 is a flow chart for explaining an operation of the print image referring system according to the present invention.

In this manner, the print setting information held by the printer 200 can be changed from the information terminal 100. FIG. 11 more exactly explains an operation that the print setting information held by the printer is changed from the information terminal 100.

Figure 12:
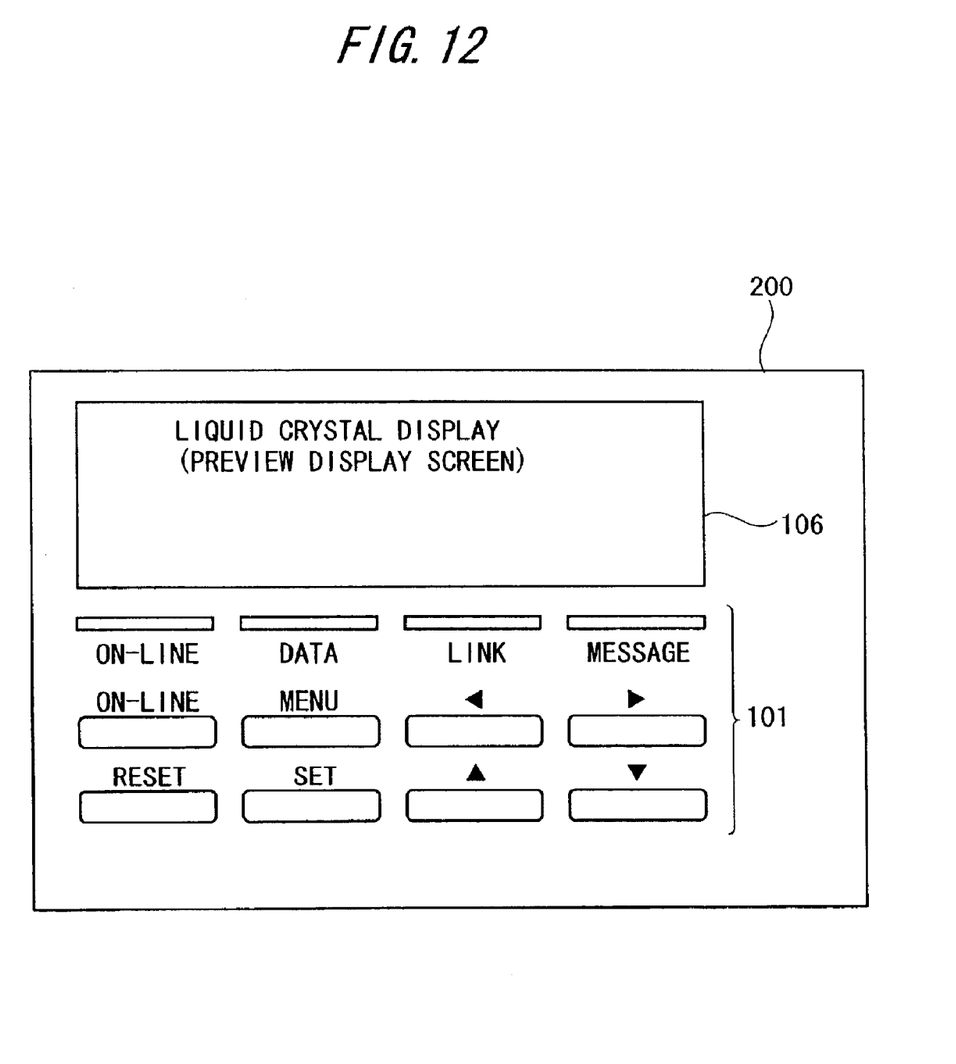
FIG. 12 is a diagram of a location of an input unit and an image display device (operation panel) in the printer included in the print image referring system according to the present invention.

The above embodiment explains the example in which the input unit 101, the display control unit 105, and the image display device 106 are provided in the information terminal 100. However, the present invention is not limited to this example. For example, the input unit 101, the display control unit 105, and the image display device 106 may be provided in the printer 200. A location of the input unit 101 and the image display device 106 in this case is shown in FIG. 12. In this case, the data acquiring unit 201 acquires identification information for specifying a print image from the input unit 101. Therefore, since the print image can be referred to before a print operation, an inappropriate print operation or an unnecessary print operation can be prevented from being executed before an actual print operation.

Figure 13:
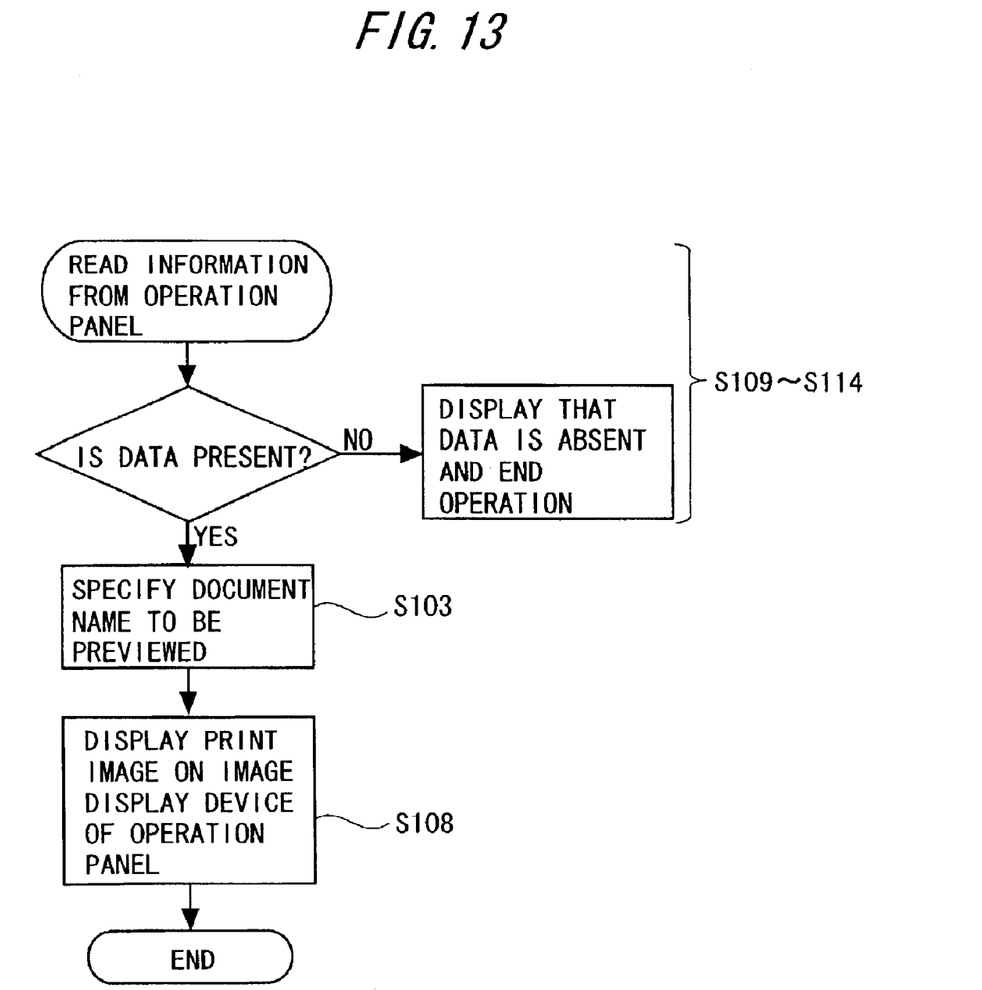
FIG. 13 is a flow chart for explaining an operation of the print image referring system according to the present invention.

FIG. 13 is a flow chart for explaining an operation of viewing a print image in the printer 200 including the input unit 101, the display control unit 105 and the image display device 106. This operation is almost the same as the operation described by using FIGS. 4 and 10.

The embodiment describes the printer driver 103*b* such that the printer driver 103*b* converts a drawing command into a print image included in print setting information as a printer output. However, The present invention is not limited to the embodiment. For example, the printer driver 103*b* may convert a drawing command into a page description language (e.g., PostScript) including print setting information as a printer output. In this case, the printer 200 generates a print image based on the page description language, and stores the generated print image in the storage unit 204.

The present invention can be achieved in other various forms without departing from the spirit and principal feature of the invention. For this reason, the embodiment described above is a simple exemplification at all points, and is not definitely construed.

As has been described above, according to the present invention, a print image can be referred to before a print operation. For this reason, an inappropriate print operation or an unnecessary print operation can be prevented from being executed before an actual print operation.

What is claimed is:

1. A printer which can refer to a print image before a print operation, comprising:

a storage unit which stores a print image and identification information to specify the print image such that the print image corresponds to the identification information;

an identification information acquiring unit acquiring the identification information to specify the print image;

a printer output acquiring unit to acquire a printer output;

a print image read unit reading the print image to which the identification information acquired by the identification information acquiring unit corresponds from the storage unit; and a print image output unit outputting the print image to an image display device, wherein the storage unit stores the print image based on the acquired printer output without the print image based on the acquired printer output being printed and identification information corresponding to said print image.

2. A printer according to claim 1, further comprising a printer output acquiring unit acquiring a print image as a printer output from an external information terminal, wherein, in the storage unit, the print image acquired by the printer output acquiring unit and identification information to specify the print image are stored such that the print image corresponds to the identification information.

3. A printer according to claim 1, further comprising: a printer output acquiring unit acquiring data to generate a print image as a printer output from an external information terminal; and a print image generation unit generating a print image based on the data acquired by the printer output acquiring unit, wherein, in the storage unit, the print image generated by the print image generation unit and identification information to specify the print image are stored such that the print image corresponds to the identification information.

4. A printer according to claim 1, wherein the identification information acquiring unit acquires identification information to specify a print image from an external information terminal, and the print image output unit transmits the print image read by the print image read unit to the external information terminal.

5. A printer according to claim 1, further comprising: an identification information input unit inputting identification information to specify a print image; and an image display device displaying the print image, wherein the identification information acquiring unit acquires identification information to specify a print image from the identification information input unit, and the print image output unit displays the print image read by the print image read unit on the image display device.

6. A printer according to claim 1, further comprising: a storage unit storing print setting information for a print image; a change information acquiring unit acquiring change information to change the print setting information; and a change unit changing the print setting information stored in the storage unit based on the change information acquired by the change information acquiring unit.

7. A printer according to claim 6, wherein the change information acquiring unit acquires change information to change the print setting information from an external information terminal.

8. A print image referring system which can refer to a print image before a print operation comprising:
   a storage unit storing the print image and identification information to specify the print image such that the print image corresponds to the identification information;
   an identification information input unit inputting the identification information to specify the print image;
   a first print image acquiring unit acquiring the print image to which the identification information input by the identification information acquiring unit corresponds from the storage unit;
   a printer output acquiring unit to acquire a printer output;
   an image display device displaying the print image acquired by the first print image acquiring unit; and
   a print image output unit outputting the print image to the image display device,
   wherein the storage unit stores the print image based on the acquired printer output without the print image based on the acquired printer output being printed and identification information corresponding to said print image.

9. A print image referring system according to claim 8 comprising a printer and an external information terminal, wherein the printer comprises the storage unit, and the external information terminal comprises the identification information input unit, the first print image acquiring unit, and the image display device.

10. A print image referring system according to claim 9, wherein the external information terminal further comprises a print image generation unit to generating a print image, the printer further comprises a second print image acquiring unit acquiring the print image generated by the print image generation unit, and the print image acquired by the second image acquiring unit and identification information to specify the print image are stored in the storage unit such that the print image corresponds to the identification information.

11. A print image referring system according to claim 9, wherein the printer further comprises a print image generation unit generate a print image, and the print image generated by the print image generation unit and identification information to specify the print image are stored in the storage unit such that the print image corresponds to the identification information.

12. A print image referring system according to claim 9, wherein the printer further comprises: a storage unit storing print setting information for a print image; a change information acquiring unit acquiring change information to change the print setting information; and a change unit changing print setting information stored in the storage unit based on the change information acquired by the change information acquiring unit.

13. A print image referring program which can refer to a print image before a print operation in a system including
   a storage unit storing the print image and identification information to specify the print image such that the print image corresponds to the identification information,
   an identification information input unit inputting the identification information to specify the print image,
   a first print image acquiring unit acquiring the print image to which the identification information input by the identification information acquiring unit corresponds from the storage unit and an image display device displaying the print image acquired by the first print image acquiring unit
   a printer output acquiring unit to acquire a printer output, said program making a computer execute:
   inputting the identification information to specifying the print image;
   acquiring the print image to which the identification information input by the identification information acquiring unit corresponds from the storage unit; and
   displaying the print image acquired by the first print image acquiring unit to an image display device,
   wherein the storage unit stores the print image based on the acquired printer output without the print image based on the acquired printer output being printed and identification information corresponding to said print image.

14. A print image referring program according to claim 13, wherein the system further including a printer and an external information terminal, wherein the printer comprises the storage unit, and the external information terminal comprises the identification information input unit, the first print image acquiring unit, and the image display device.

15. A print image referring program according to claim 14, wherein the external information terminal further comprises a print image generation unit to generating a print image, and the printer further comprises a second print image acquiring unit acquiring the print image generated by the print image generation unit; and
   further making said computer execute:
   storing the print image acquired by the second image acquiring unit and identification information to specify the print image in the storage unit such that the print image corresponds to the identification information.

16. A print image referring program according to claim 14, wherein the printer further comprises a print image generation unit to generate a print image; and
   further making said computer execute:
   storing the print image generated by the print image generation unit and identification information to specify the print image in the storage unit such that the print image corresponds to the identification information.

17. A print image referring program according to claim 14, wherein the printer further comprises: a storage unit storing print setting information for a print image, and a change information acquiring unit acquiring change information for changing the print setting information; and further making said computer execute:

changing print setting information stored in the storage unit based on the change information acquired by the change information acquiring unit.

* * * * *